2,889,303
ACRYLONITRILE POLYMER COMPOSITION STABILIZED WITH TETRAKIS HYDROXYMETHYL PHOSPHONIUM CHLORIDE AND METHOD OF MAKING SAME

Hobson D. De Witt, New Wilmington, Pa., assignor to The Chemstrand Corporation, Decatur, Ala., a corporation of Delaware No Drawing. Application December 19, 1956
Serial No. 629,222

18 Claims. (Cl. 260—32.6)

This invention relates to the stabilization of acrylonitrile polymers and compositions thereof. More particularly, it relates to the stabilization of acrylonitrile polymers and compositions thereof which have a tendency to develop color upon standing or application of heat.

The term "polymer," as employed in the instant description and claims is intended to include homopolymers, copolymers, and blends thereof, said polymers containing at least 80 percent by weight of polymerized or copolymerized acrylonitrile in the polymer molecule.

Acrylonitrile polymers containing 80 percent or more of acrylonitrile are generally insoluble in the more common solvents. And, in those instances where suitable solvents have been found, in order to effect solution, the application of heat is usually necessary. Where heat is employed in forming solutions, from which shaped articles are to be formed, a tan to dark brown color frequently develops in the solution and thereafter is carried over into the product formed therefrom. This color also develops in solution upon standing for prolonged periods of time. In addition, shaped articles formed from solutions of acrylonitrile polymers are likewise subject to the development of color upon heating the finished articles. In the instance of textile fibers formed from solutions of acrylonitrile polymers color may be developed upon prolonged heating which results from ironing of fabrics produced therefrom and in high-temperature drying of such fabrics.

The mechanism which causes color formation has not been definitely ascertained, although a variety of reasons therefor have been advanced. The presence of metal ions such as iron, copper and manganese in the solutions may cause the color. The employment of amide compounds as solvents may result in the formation of amines when heat is applied and cause color in the compositions and resulting shaped articles. Impurities present in the solvents have also been cited as a cause. Whatever may be the reason for color formation, it results in compositions and products of undesirable standards and, therefore has been the source of concern, particularly in commercial operations where such types of polymers, copolymers, or blends are employed.

Accordingly, it is an object of the present invention to prevent undesirable color formation in acrylonitrile polymers and compositions thereof. Another object is to minimize color formation when solutions of acrylonitrile polymers are permitted to stand for a prolonged period of time or upon application of heat. It is also an object of the invention to prevent color formation in acrylonitrile polymers and shaped articles formed therefrom at elevated temperatures. A still further object of the invention is the production of solutions of acrylonitrile polymers and articles produced therefrom having improved color characteristics. Other objects and advantages will be apparent from consideration of the description of the invention hereinafter.

In general the objects of the invention are accomplished by dissolving the polymer of acrylonitrile in a suitable solvent therefor and preventing or minimizing color formation by the presence in the solution, as an inhibiting agent, of tetrakis hydroxymethyl phosphonium chloride. This inhibiting agent permits prolonged standing of the solution or exposure to high temperatures for considerable periods of time without the development of a high degree of objectionable color incident to the dissolving of the said polymers in solvents therefor. The inhibiting agent present in the polymer solutions is likewise present in the shaped articles produced from the solutions and minimizes or prevents the development of a high degree of objectionable color as a result of the process of forming the said shaped articles.

The total amount of inhibiting agent which may be employed is not critical, and may range from about 0.2 to about 20 percent based on the total polymer weight. However, it is preferred that the inhibiting agent of the instant invention be present in a small amount compared to the amount of polymer dissolved. Thus, although the amount is not critical, it is preferred that the inhibiting agent be present in the amount of about 0.2 to 2.0 percent based on the total weight of the polymer. The inhibiting agent may be added before, during, or after the dissolution of the polymer in the solvent. The preferred method of practicing this invention involves the addition of tetrakis hydroxymethyl phosphonium chloride to the polymer solvent prior to adding the polymer, since in this manner the development of any color, as by heating, will be prevented from the initial contact of polymer and solvent. The compositions of the instant invention may be prepared in a varying temperature range. Thus, the compositions may be prepared by mixing the polymer, a suitable solvent, and the inhibiting agent at any temperature and thereafter heating the mixture to any temperature up to the boiling point of the solvent to insure dissolution of the polymer. However, it is preferred that the inhibiting agent be added to the solvent or polymer solution while it is at a temperature of from about —10° C. to about 50° C. and thereafter heating to more rapidly dissolve the polymer.

Among the solvents which may be used in practicing the instant invention are N,N-dimethylformamide, N,N-dimethylacetamide, ethylene carbonate, sulfolane, nitromethane, gamma-butyrolactone, aqueous solutions of zinc chloride, aqueous solutions of sodium thiocyanate, sulfuric acid, aqueous solutions of nitric acid, and the like. These solvents generally function as solvents for acrylonitrile polymers at temperatures of from about 25° C. to the boiling point of the polymer solvent mixtures.

The use of tetrakis hydroxymethyl phosphonium chloride, in accordance with the present invention, effects improvement in color characteristics in all solutions and articles produced therefrom of acrylonitrile polymers, including not only polyacrylonitrile, but also acrylonitrile copolymers and interpolymers, particularly those containing at least 80 percent by weight of acrylonitrile in the polymer molecule as well as in blends of such acrylonitrile fiber-forming polymers with readily dyeable basic copolymers, the blend having an overall polymerized acrylonitrile content of at least 80 percent by weight. While the preferred polymers employed in the instant invention are those containing at least 80 percent acrylonitrile, generally recognized as the fiber-forming acrylonitrile polymers, it will be unedrstood that the invention is likewise applicable to polymers containing less than 80 percent of acrylonitrile and the same stability is realized with the inhibiting agent defined herein. The acrylonitrile polymers containing less than 80 percent of acrylonitrile are useful in forming films, coating compositions, molding operations, lacquers, and the like, in all of which applications the alleviation of undesirable color is extremely important.

For example the polymer may be a copolymer of from 80 to 98 percent of acrylonitrile and from 2 to 20 percent of another copolymerizable mono-olefinic monomer. Suitable copolymerizable mono-olefinic monomers include acrylic, alpha-chloroacrylic and methacrylic acids, the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic esters; N-vinyl carbazole; vinyl furane; alkyl vinyl esters; vinyl sulfonic acid; ethylene alpha,beta-dicarboxylic acids or their anhydrides or derivatives, such as diethylcitraconate, diethylmesaconate; styrene; vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine, and the like; 1-vinylimidazole and alkyl-substituted 1-vinylimidazoles, such as 2-, 4-, or 5-methyl-1-vinylimidazole, and other mono-olefinic copolymerizable monomeric materials.

The polymer can be a ternary interpolymer, for example, products obtained by the interpolymerization of acrylonitrile and two or more of any of the monomers, other than acrylonitrile, enumerated above. More specifically, and preferably, the ternary polymers contain from 80 to 98 percent of acrylonitrile, from 1 to 10 percent of a vinylpyridine or a 1-vinylimidazole, and from 1 to 18 percent of another copolymerizable mono-olefinic substance, such as methacrylonitrile, vinyl acetate, methylmethacrylate, vinyl chloride, vinylidiene chloride, and the like.

The polymer can also be a blend of polyacrylonitrile or a copolymer of from 80 to 99 percent acrylonitrile and from 1 to 20 percent of at least one other mono-olefinic copolymerizable monomeric substance with from two to fifty percent of the weight of the blend of a copolymer of from 10 to 70 percent of acrylonitrile and from 30 to 90 percent of at least one other mono-olefinic copolymerizable monomer. Preferably, when the polymeric material comprises a blend, it will be a blend of a copolymer of 80 to 98 percent acrylonitrile and from 2 to 20 percent of another mono-olefinic monomer, such as vinyl acetate, which is not receptive to dyestuff, with a sufficient amount of a copolymer of from 10 to 70 percent of acrylonitrile and from 30 to 90 percent of a vinyl-substituted tertiary heterocyclic amine, such as a vinylpyridine or a 1-vinylimidazole, to give a dyeable blend having an overall vinyl-substituted tertiary heterocyclic amine content of from 2 to 10 percent, based on the weight of the blend.

The tests for color indicative of approaching whiteness used throughout the examples which follow consist of measurements of purity and brightness as calculated from the tristimulus values determined on a General Electric spectrophotometer by the methods recommended by the Standard Observer and Coordinate System of the International Commission on Illumination, as fully set forth in the Handbook of Colorimetry, published by The Technology Press, Massachusetts Institute of Technology, in 1936.

The instant invention is further illustrated by the following specific examples, in which proportions and percentages are by weight unless otherwise specified.

EXAMPLE I 1.0 gram of a polymer blend of 88 percent of a copolymer containing 94 percent of acrylonitrile and 6 percent of vinyl acetate and 12 percent of a copolymer of 50 percent of acrylonitrile and 50 percent of 2-methyl-5-vinylpyridine were added to 19 ml. of N,N-dimethylacetamide. The mixture was stirred and heated to 80° C., at which temperature it was maintained for a period of two hours in a constant temperature bath. The resulting solution was then quickly cooled to room temperature and the color, as represented by values for purity and brightness, was determined by light transmittance measurement on the spectrophotometer. The values for purity and brightness of this sample which was used as a control are set forth in Table I below. At the same time an identical sample of the same polymer and solvent in the same amounts was prepared in the same manner, but containing 0.2 gram of tetrakis hydroxymethyl phosphonium chloride as a color inhibitor. The values for purity and brightness of the inhibited solution determined in the same manner as the control are likewise set forth in Table I below.

*Table I*

| Percent inhibitor based on polymer weight | Purity | Brightness |
| --- | --- | --- |
| Control | 6.5 | 85.7 |
| 20 | 4.6 | 88.2 |

EXAMPLE II 1.0 gram of the same polymer blend as employed in Example I above was added to 19 ml. of N,N-dimethylformamide. The mixture was heated to 80° C. and maintained at that temperature for a period of two hours in a constant temperature bath. It was then quickly cooled to room temperature and the same color values determined by transmittance measurements as set out above. The values for purity and brightness of this control sample are set out below. At the same time a sample of the same polymer and solvent in the same amounts was prepared in the same manner but containing 0.1 gram of tetrakis hydroxymethyl phosphonium chloride as a color inhibitor. The values for purity and brightness are set out in Table II below.

*Table II*

| Percent inhibitor based on polymer weight | Purity | Brightness |
| --- | --- | --- |
| Control | 10.0 | 81.8 |
| 10 | 6.7 | 87.9 |

EXAMPLE III 1.0 gram of polyacrylonitrile was added to 19 ml. of N,N-dimethylacetamide. The mixture was stirred and heated to 80° C. at which temperature it was maintained for a period of two hours in a constant temperature bath. It was then quickly cooled to room temperature and the same color measurements made in the same manner as set out above. The values for purity and brightness of this control sample are set out in Table III below. At the same time an identical sample of the same polymer and solvent in the same amounts was prepared in the same manner but containing 0.02 gram of tetrakis hydroxymethyl phosphonium chloride as the color inhibitor. The values for purity and brightness of the inhibited solution are set out in Table III below.

*Table III*

| Percent inhibitor based on polymer weight | Purity | Brightness |
| --- | --- | --- |
| Control | 6.0 | 89.0 |
| 2 | 4.6 | 89.0 |

EXAMPLE IV 7.5 grams of the same polymer blend as employed in Example I above were slurried at −10° C. with 45 ml. of N,N-dimethylacetamide containing approximately 0.15 gram of titanium dioxide as a delustrant. The mixture was stirred and heated to 90° C. for a period of 50 minutes. It was then quickly cooled to room temperature and the color measured by determining values for purity and brightness from the tristimulus values as determined on a spectrophotometer by reflectance measurements, since the solutions containing the delustrant were opaque. The values for purity and brightness of this control sample are set out in Table IV below. At the same time identical samples were prepared from the same polymer and the same solvent in identical amounts and by the same method of preparation but containing 0.075 gram, 0.0375 gram, and 0.01875 gram respectively of tetrakis hydroxymethyl phosphonium chloride as a color inhibitor. The values for purity and brightness determined in the same manner as for the control are set out in Table IV below.

Table IV

| Percent inhibitor based on polymer weight | Purity | Brightness |
|---|---|---|
| Control | 10.0 | 57.7 |
| 1 | 4.2 | 60.7 |
| 0.5 | 4.3 | 62.1 |
| 0.25 | 5.8 | 60.9 |

EXAMPLE V

A series of four solutions were prepared by slurrying at −10° C. 7.5 grams of a copolymer containing 90 percent acrylonitrile and 10 percent vinyl acetate with 45 ml. of N,N-dimethylacetamide containing approximately 0.15 gram of titanium dioxide as a dilustrant and heating the mixture with stirring to 80° C. One of such samples was immediately cooled to room temperature and the other three held at 80° C. for periods of one hour, two hours, and four hours, respectively. They were thereafter cooled to room temperature and the color of each sample was measured by determining the values for purity and brightness by reflectance measurements made upon the spectrophotometer. The values for purity and brightness for these control samples are set out in Table V below. At the same time a series of four samples was prepared from the same polymer and solvent and in the same manner, but containing 0.075 gram of tetrakis hydroxymethyl phosphonium chloride, which is equivalent to 1.0 percent based on the weight of the polymer in the sample. Each of the color inhibited samples was treated in a manner identical to one of the four control samples set out above. After cooling to room temperature the values for purity and brightness were determined in the same manner and are set out in Table V below.

Table V

| Samples | Heated at 80° C. | | | |
|---|---|---|---|---|
| | 0 hour | 1 hour | 2 hours | 4 hours |
| Control purity | 10.3 | 12.8 | 15.8 | 16.0 |
| Control brightness | 61.9 | 61.4 | 58.5 | 57.0 |
| 1% inhibitor purity | 5.5 | 6.7 | 7.3 | 8.0 |
| 1% inhibitor brightness | 62.6 | 61.9 | 62.8 | 61.7 |

EXAMPLE VI

Two series of spinning solutions, five solutions containing no color inhibitor and five solutions containing tetrakis hydroxymethyl phosphonium chloride were prepared, fibers were extruded from these solutions, and the color values of the resulting fibers determined. The spinning solutions consisted of 18 percent solutions of a polymer blend of 88 percent of a copolymer containing 94 percent arcrylonitrile and 6 percent vinyl acetate and 12 percent of a copolymer containing 50 percent of acrylonitrile and 50 percent of 2-methyl-5-vinyl pyridine in a solvent consisting of N,N-dimethylacetamide containing 2.0 percent of acetic acid and also containing 0.8 percent of titanium dioxide delustrant, based on the weight of the polymer. The polymers were first slurried and then dissolved in the solvent by rapid heating to approximately 100° C. and they were thereafter cooled to 60° C. before extrusion into a coagulating bath consisting of 55 percent of N,N-dimethylacetamide and 45 percent water at 50° C. After extrusion the fibers were relaxed in an atmosphere of steam, crimped, cut into 2½ inch staple lengths, and carded to produce card sliver. The color measurements of the fibers were determined by samples of card sliver measured by reflectance values on a spectrophotometer. The average of five determinations of the values for purity and brightness from each series of samples are set out in Table VI below. The control samples contained no color inhibitor and the inhibited samples contained 1.75 percent of tetrakis hydroxymethyl phosphonium chloride, based on the weight of the polymer.

Table VI

| | Average of 5 samples | |
|---|---|---|
| | Purity | Brightness |
| Control | 6.6 | 85.9 |
| 1.75% inhibitor | 5.9 | 88.9 |

EXAMPLE VII

Samples of spinning solutions were prepared in the same manner as in Example VI above containing 24 percent of a copolymer containing 94 percent acrylonitrile and 6 percent vinyl acetate in a solvent consisting of N,N-dimethylacetamide containing 2.0 percent of acetic acid and also containing 0.8 percent of titanium dioxide, based on the weight of the polymer. One of these solutions contained no color inhibitor and was used as a control, while the other contained 1.2 percent tetrakis hydroxymethyl phosphonium chloride, based on the weight of the polymer. These solutions were extruded and the fibers finished in the same manner as set out in Example VI above. The color values were determined on card sliver measured by tristimulus values determined on a reflectance spectrophotometer. The values for purity and brightness of each of the samples is set out in Table VII below.

Table VII

| | Purity | Brightness |
|---|---|---|
| Control | 7.6 | 86.4 |
| 1.25% inhibitor | 5.5 | 91.0 |

The compositions of the instant invention present many advantages. For example, products formed from the polymer solutions of the instant invention are free of objectionable color and therefore are of greater commercial value. This is evidenced by Examples VI and VII above where textile fibers were produced from each of the polymers used in those examples having much superior color properties, closely approaching a true white, which effect was carried over from the more stable spinning solutions prepared by the process of the present invention. In preparing the polymer solutions heat may be applied without danger of color formation, and the solutions, if necessary, may stand for prolonged periods of time and remain free of color. The inhibiting agent is readily available and relatively inexpensive. Therefore, no great increase in production cost is necessary. The compositions containing the inhibitor may be prepared without going through detailed and elaborate procedures that necessitate extensive changes in the design of the apparatus used to manufacture them.

As many widely different embodiments of this invention may be made without departing from the spirit and scope thereof, it is to be understood that the invention is not limited to specific embodiments thereof except as defined in the appended claims.

I claim:

1. A new composition of matter comprising a polymer containing in polymerized form at least 80% of acrylonitrile and up to 20 percent of at least one copolymerizable mono-olefinic monomer, a solvent therefor, and, as a color inhibitor, tetrakis hydroxymethylphosponium chloride.

2. A new composition of matter as defined in claim 1 wherein the polymer is polyacrylonitrile.

3. A new composition of matter as defined in claim 1 wherein the polymer is a copolymer containing 80 to 98 percent of acrylonitrile and 2 to 20 percent of a mono-olefinic monomer copolymerizable therewith.

4. A new composition of matter as defined in claim 1 wherein the polymer is a copolymer containing 80 to 98 percent of acrylonitrile and 2 to 20 percent of vinyl acetate.

5. A new composition of matter as defined in claim 1 wherein the polymer is a blend of 80 to 99 percent of (A) a copolymer containing 80 to 98 percent of acrylonitrile and 2 to 20 percent of a copolymerizable mono-olefinic monomer and 1 to 20 percent of (B) a copolymer containing 10 to 70 percent of acrylonitrile and 30 to 90 percent of a vinyl-substituted tertiary heterocyclic amine, said blend being so proportioned that the vinyl-substituted tertiary heterocyclic amine comprises from 2 to 10 percent by weight of the blend.

6. A new composition of matter as defined in claim 1 wherein the polymer is a blend of 80 to 99 percent of (A) a copolymer containing from 80 to 98 percent of acrylonitrile and 2 to 20 percent of vinyl acetate and 1 to 20 percent of (B) a copolymer containing 10 to 70 percent of acrylonitrile and 30 to 90 percent of 2-methyl-5-vinylpyridine said blend being so proportioned that the 2-methyl-5-vinylpyridine comprises from 2 to 10 percent by weight of blend.

7. A new composition of matter as defined in claim 1 wherein the solvent is N,N-dimethylacetamide.

8. A new composition of matter comprising a polymer containing in polymerized form at least 80 percent of acrylonitrile and up to 20 percent of at least one copolymerizable mono-olefinic monomer, a solvent therefor, and, as a color inhibitor from 0.2 to 20 percent of tetrakis hydroxymethyl phosphonium chloride based on the total weight of the polymer.

9. A new composition of matter comprising a copolymer having 80 to 98 percent of acrylonitrile and 2 to 20 percent of vinyl acetate, a solvent therefor, and/or a color inhibitor, from 0.2 to 20 percent of tetrakis hydroxymethyl phosphonium chloride based on the total weight of the polymer.

10. A new composition of matter comprising a polymer blend of (A) a copolymer containing 80 to 98 percent of acrylonitrile and 2 to 20 percent of another copolymerizable mono-olefinic monomer and (B) a copolymer containing 10 to 70 percent of acrylonitrile and 30 to 90 percent of vinyl-substituted tertiary heterocyclic amine, said blend having an overall vinyl-substituted tertiary heterocyclic amine content of from 2 to 10 percent based on the weight of the blend, a solvent therefor and, as a color inhibitor from 0.2 to 20 percent of tetrakis hydroxymethyl phosphonium chloride based on the total weight of the polymer.

11. A new composition of matter comprising a polymer blend of 80 to 99 percent of (A) a copolymer containing 80 to 98 percent of acrylonitrile and 2 to 20 percent of vinyl acetate and 1 to 20 percent of (B) a copolymer containing 10 to 70 percent of acrylonitrile and 30 to 90 percent of 2-methyl-5-vinylpyridine, said blend being so proportioned that the 2-methyl-5-vinylpyridine comprises from 2 to 10 percent by weight of blend, a solvent therefor, and, as a color inhibitor, from 0.2 to 20 percent of tetrakis hydroxymethyl phosphonium chloride based on the total weight of the polymer.

12. A method for preparing a new composition of matter comprising mixing a polymer containing in polymerized form at least 80 percent of acrylonitrile and up to 20 percent of at least one copolymerizable mono-olefinic monomer, a solvent therefor, and tetrakis hydroxymethyl phosphonium chloride, and heating the mixture to form an homogenous solution.

13. The method as defined in claim 12 wherein the polymer is polyacrylonitrile.

14. The method as defined in claim 12 wherein the polymer is a copolymer containing from 80 to 98 percent of acrylonitrile and from 2 to 20 percent of another mono-olefinic monomer copolymerizable therewith.

15. The method as defined in claim 12 wherein the polymer is a blend of 80 to 99 percent of (A) a copolymer containing from 80 to 98 percent of acrylonitrile and 2 to 20 percent of a copolymerizable mono-olefinic monomer and 1 to 20 percent of (B) a copolymer containing 10 to 70 percent of acrylonitrile and 30 to 90 percent of a vinyl-substituted tertiary heterocyclic amine, said blend being so proportioned that the vinyl-substituted tertiary heterocyclic amine comprises from 2 to 10 percent by weight of the blend.

16. A method for preparing a new composition of matter comprising mixing a copolymer containing from 80 to 98 percent of acrylonitrile and from 2 to 20 percent of vinyl acetate, a solvent therefor, and 0.2 to 20 percent, based on the total weight of the copolymer, of tetrakis hydroxymethyl phosphonium chloride, and heating the mixture to a temperature of from 25° C. to the boiling point of said mixture to form an homogenous solution.

17. A method for preparing a new composition of matter comprising mixing a polymer blend of 80 to 99 percent of (A) a copolymer containing 80 to 98 percent of acrylonitrile and 2 to 20 percent of vinyl acetate and 1 to 20 percent of (B) a copolymer containing 10 to 70 percent of acrylonitrile and 30 to 90 percent of 2-methyl-5-vinylpyridine said blend being so proportioned that the 2-methyl-5-vinylpyridine comprises from 2 to 10 percent by weight of blend, a solvent therefor, and 0.2 to 20 percent based on the total weight of the polymer blend, of tetrakis hydroxymethyl phosphonium chloride, and heating the mixture to a temperature of from 25° C. to the boiling point of said mixture to form an homogenous solution.

18. A method for preparing a new composition of matter comprising mixing polyacrylonitrile, a solvent therefor, and 0.2 to 20 percent based on the total weight of polyacrylonitrile, of tetrakis hydroxymethyl phosphonium chloride, and heating the mixture to a temperature of from 25° C. to the boiling point of said mixture to form an homogenous solution.

No references cited.